(12) United States Patent
Bettenhausen et al.

(10) Patent No.: US 8,632,253 B2
(45) Date of Patent: Jan. 21, 2014

(54) BEARING UNIT OF A SHAFT OF A PRESSURE GENERATING DEVICE

(75) Inventors: Jens Bettenhausen, Külshelm (DE);
Helmut Hauck, Euerbach (DE);
Thomas Heege, Schweinfurt (DE);
Hubert Herbst, Gädhelm (DE); Sandra Kamm, Gochsheim (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/394,484

(22) PCT Filed: Sep. 2, 2010

(86) PCT No.: PCT/EP2010/062839
§ 371 (c)(1),
(2), (4) Date: May 11, 2012

(87) PCT Pub. No.: WO2011/029765
PCT Pub. Date: Mar. 17, 2011

(65) Prior Publication Data
US 2012/0219247 A1 Aug. 30, 2012

(30) Foreign Application Priority Data
Sep. 12, 2009 (EP) .................................. 09011699

(51) Int. Cl.
*F16C 33/60* (2006.01)
*F16C 33/66* (2006.01)

(52) U.S. Cl.
USPC .......................................... 384/504; 384/517

(58) Field of Classification Search
USPC ......... 384/499, 502, 504–506, 512, 517, 526, 384/518
See application file for complete search history.

(56) References Cited

U.S. PATENT DOCUMENTS 3,738,719 A * 6/1973 Langner ........................ 384/517

FOREIGN PATENT DOCUMENTS

| DE | 202004017194 U1 | 3/2006 |
| DE | 102006017443 A1 | 10/2007 |
| EP | 0095561 A2 | 12/1983 |
| EP | 0241879 A1 | 10/1987 |
| EP | 1845271 A2 | 10/2007 |
| JP | 10103347 A | 4/1998 |

* cited by examiner

*Primary Examiner* — Phillip A Johnson
(74) *Attorney, Agent, or Firm* — Bryan Peckjian; SKFUSA Inc. Patent Department (57) ABSTRACT

A bearing unit rotatably supports a shaft of a pressure generating device, such a boost pressure generating device of an internal combustion engine. The bearing unit includes at least a first rolling-element bearing and a second rolling-element bearing, each rolling-element bearing having an inner ring and an outer ring. An annular space is defined between the respective inner and outer rings and rolling elements are disposed in the annular space. At least one volume element is disposed in the annular space and at least partially fills the annular space in an axial area.

18 Claims, 10 Drawing Sheets

BEARING UNIT OF A SHAFT OF A PRESSURE GENERATING DEVICE

CROSS-REFERENCE

This application is the U.S. national stage of International Application No. PCT/EP2010/062839 filed on Sep. 2, 2010, which claims priority to German patent application no. 09 011 699.7 filed on Sep. 12, 2009.

TECHNICAL FIELD

The invention relates to a bearing unit of a shaft of a pressure generating device, in particular, of a boost pressure generating device of an internal combustion engine, wherein the shaft is supported by at least a first rolling-element bearing and at least a second rolling-element bearing, wherein each rolling-element bearing has an inner ring and an outer ring, wherein an annular space is formed between the rings and wherein rolling bodies are disposed in the annular space.

RELATED ART

For example, a bearing unit of this type is known from the DE 20 2004 017 194 U1. Here, the shaft of an exhaust-gas turbo charger is guided in two angular-contact ball bearings, which are adjusted relative to each other and therefore hold the shaft under a defined pre-tensioning.

Known systems for supercharging internal combustion engines, in particular, turbo chargers, are mostly based upon rotating subsystems, which are usually supported by rolling-element bearings. Sufficient lubrication of the bearing is an important factor determining the service life of the bearing.

SUMMARY

To cope with the constant cost pressure, grease lubrication is preferred to oil lubrication. However, when the to-be-borne shaft is not arranged horizontally in a bearing, the problem arises due to gravity that, over time, the grease required for the lubrication and/or the oil therein are prone to leak from the area of the rolling-element bearing tracks. This normally necessitates a complete sealing of the installed bearing in such a case.

There are applications in charging systems that intentionally allow or require an inclined position of the bearings, in the extreme case even prescribe a vertical rotational axis. Such a situation occurs, e.g., in the so-called gas-dynamic pressure wave superchargers.

According to one aspect of the present teachings, a bearing unit of a pressure generating device is preferably designed so that positions of the shaft of the pressure generating device, which do not correspond to the horizontal position, also can be used without difficulty. In this case, it should be constantly ensured that a sufficient supply of lubricant for the bearing is guaranteed. A cost effective concept should also be possible.

According to another aspect of the present teachings, at least one volume element is disposed in the annular space between the inner and outer ring of the bearing, which volume element at least partially fills the annular space in an axial area.

According to a preferred exemplary embodiment, the two rolling-element bearings are disposed adjacently to and bordering each other, wherein the volume element is disposed in the axial area between the rolling bodies of the two rolling-element bearings.

It is also alternatively or additionally possible that the volume element is disposed in an axial end portion of the rolling-element bearing adjacent to or near an end side of the rolling-element bearing.

The volume element is preferably formed as annular, in particular solid body. However, a hollow design of the volume element is also possible.

The volume element can extend over a majority of the radial extension of the annular space, in particular over at least 50% of the radial extension of the annular space.

The two inner rings of the two rolling-element bearings can be embodied as one piece with each other. It is also possible that the two outer rings of the two rolling-element bearings are embodied as one piece with each other.

According to a further development, the volume element can be formed as an enlarged portion of a rolling-element bearing cage.

Further, the volume element can be axially fixed in the annular space by using an interference-fit connection. It can form a seal of the annular space to the inner ring and/or the outer ring.

The two rolling-element bearings can be disposed adjacently, wherein a spring element is operatively disposed between the inner rings and/or the outer rings, which spring element generates an axial pre-tensioning in the rolling-element bearings. The spring element can also be formed by the volume element itself.

The volume element can be comprised of metal, in particular steel or light metal, plastic material or ceramic material.

The rolling-element bearings are preferably formed as ball bearings, in particular as deep-groove ball bearings or angular-contact ball bearings, wherein the balls are comprised in particular of ceramic material.

The bearing unit is preferably a component of a boost pressure generating device of an internal combustion engine, wherein the boost pressure generating device is an exhaust-gas turbo charger, a mechanical compressor or a gas-dynamic pressure wave supercharger.

In order to make a solution available that is as cost-effective as possible but is also functional over the entire service life, an at least two-rowed rolling-element bearing preferably has at least one intermediate element arranged between the rolling body rows. This intermediate element fills at least one portion of the existing intermediate space with the goal of keeping lubricant, which is located in the area of the rolling body rows, in the track areas. Further, an end element may be disposed between the rolling body rows and the bearing end sides. This end element fills a majority of the existing intermediate space with the goal of keeping lubricant, which is located in the area of the rolling body rows, in the track areas.

While a horizontal orientation of the rotating shaft is often provided in known bearing systems, wherein the lubricant supply of the bearing is relatively unproblematic, the proposed solution makes it possible to also supply the bearing with sufficient lubrication in an assembly where the shaft diverges from the zero degree, i.e. from the horizontal, so that sufficient lubrication of the rolling-element bearing rows is ensured over the most common entire service life of 300,000 km. The inventive proposal enables an oblique installation position (in the entire range between the horizontal disposition of the shaft and its vertical disposition), wherein a grease-lubricated system is provided.

The proposed solution is provided in particular for a charger for internal combustion engines. However, it is also suitable for all applications wherein a pressure increase of a medium is a basic function.

A preferred solution provides that, in addition to the mentioned bearing, a separate needle bearing is utilized. Between the mentioned bearing and the needle bearing, an intermediate portion, preferably a sleeve-shaped intermediate portion, can be disposed between a locating bearing and a non-locating bearing.

Post-lubrication possibilities for the bearing are preferably provided so that a lubricant, in particular grease, can be resupplied.

It can also be provided that one or multiple tracks of the bearing is/are defined directly in the outer circumference of the to-be-borne shaft; a separate bearing ring is then omitted accordingly.

The volume element can simultaneously undertake a sealing function and can be built accordingly for such purpose. A labyrinth-like concept for the sealing, as well as such a one having a contacting sealing lip, is possible.

The entire bearing can be provided with an intermediate element, wherein at least two bearing rows having spaced bearing rings form a pre-assembled bearing unit by using an additional, e.g., sleeve-shaped retaining fixture. The entire bearing having the intermediate element can be embodied such that at least two bearing rows having separate bearing rings form a pre-assembled bearing unit by using an additional connecting element. The connection of the two rings (as a pre-assembled unit) can be implemented by a subsequent deformation process of the connecting element.

The connecting element can exert a tensile- and/or compressive force on the two bearing rings directly or indirectly by using additional elements so that it leads to a pre-tensioning of the two bearing rows.

The entire bearing having the intermediate element can be embodied so that, in the installed state, at least one bearing row exerts a compressive force on at least one bearing ring by using at least one additional fitting part, so that it leads to a defined internal clearance and/or bearing pre-tensioning of the bearing row. The fitting element can simultaneously form the intermediate element (one-piece or multi-piece).

The volume element can be comprised of a metallic material (e.g., aluminum, steel or sintered material) or a non-metallic material (e.g., plastic, elastomer material or ceramic). It can also be comprised of a composite material.

The volume element can be manufactured using a casting process or a stamping process.

The preferred charger types, to which the invention is applied, are the exhaust-gas turbo charger, the mechanical charger (compressor) or the gas-dynamic pressure wave supercharger (Hyprex- or Comprex-charger).

BRIEF DESCRIPTION OF THE DRAWINGS

Exemplary embodiments of the invention are illustrated in the drawings.

DETAILED DESCRIPTION OF THE INVENTION

Figure 1:
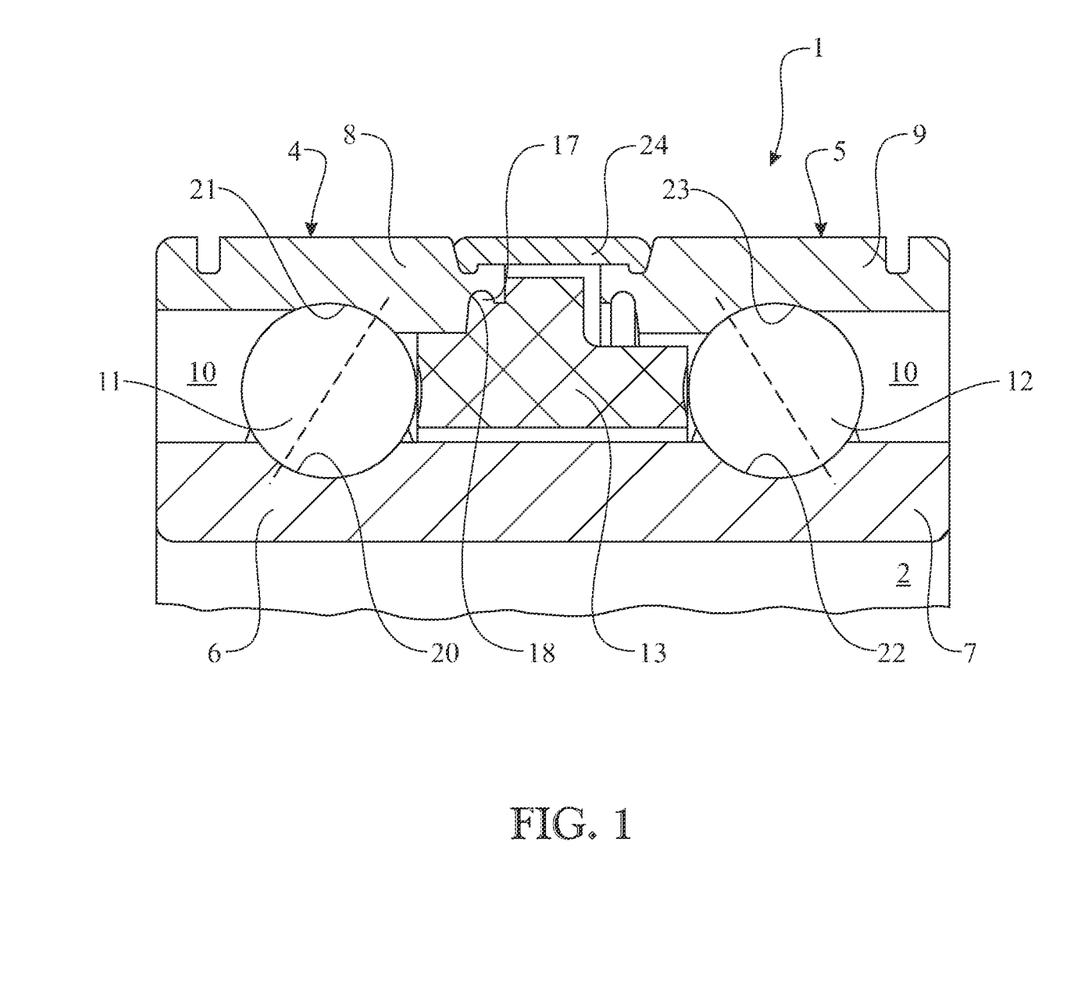
FIG. 1 shows the radial section of a bearing unit according to a first embodiment of the invention.

In FIG. 1 a bearing unit 1 is illustrated, which has two rolling-element bearings 4 and 5, i.e. a first rolling-element bearing 4 and a second rolling-element bearing 5. Both rolling-element bearings are formed as deep-groove ball bearings and each has a row of rolling bodies (balls) 11 and 12, respectively. Both rolling-element bearings 4, 5 have a common inner ring 6 and 7, respectively, which is formed as one-piece; however, each bearing 4, 5 has an outer ring 8, 9, respectively.

A shaft 2 of a boost pressure generating device of a combustion engine is supported by the bearing unit 1, which shaft 2 is only implied.

An annular space 10 is defined between the outer rings 8, 9 and the one-piece inner ring 6, 7 of the two bearings 4, 5; lubricating grease is introduced into the annular space 10 for the intended use of the bearing unit 1.

In order to keep the lubricating grease as much as possible in the area of the tracks 20, 21, 22 and 23 of the two bearings 4, 5, even when the shaft 2 is supported not horizontally but rather diverging from the horizontal position, a volume element 13 is disposed in the annular space 10 between outer and inner rings.

The present case concerns a ring made from plastic material that is impenetrable for the lubricant. It pushes the lubricating grease out of the annular space 10 into the axial area, along which the volume element extends, so that the grease is held in the area of the tracks 20, 21 22 and 23.

In the exemplary embodiment according to FIG. 1, the axial fixing of the volume element 13 is effected by an interference-fit connection 17, 18. It has a projection 17, which engages in a shape-congruent recess 18. Both the projection 17 and the recess 18 are formed in a rotationally-symmetric manner. When the projection 17 snaps into the recess 18 during the assembly, the volume element 13 is axially fixed.

The two outer rings 8, 9 are held together by a connecting element 24. Using the connecting element 24, an axial pre-tensioning between the bearing outer rings 8, 9 can also be generated so that contact angles (depicted with broken lines in the balls 11, 12) result in the bearings 4, 5.

Figure 2:
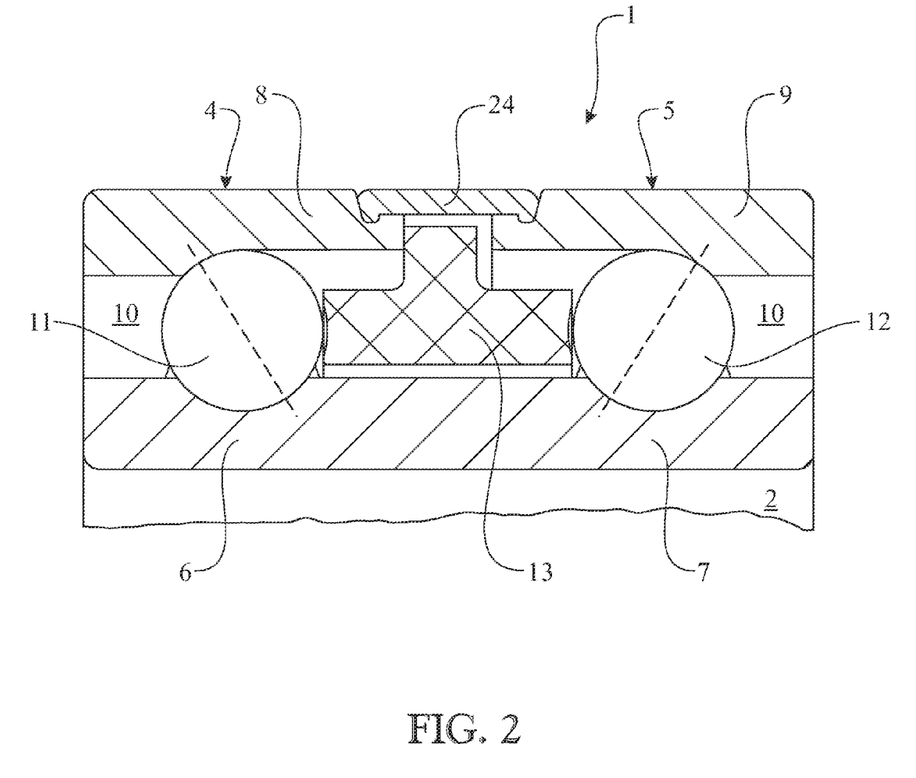
FIG. 2 shows the radial section of a bearing unit according to a second embodiment of the invention.

In FIG. 2 an alternative to the solution according FIG. 1 is shown. Again, the volume element 13 is disposed in the annular space 10 between the two rolling body rows 11, 12. Here, an axial fixing of the volume element 13 using an interference-fit connection is dispensed with.

Figure 3:
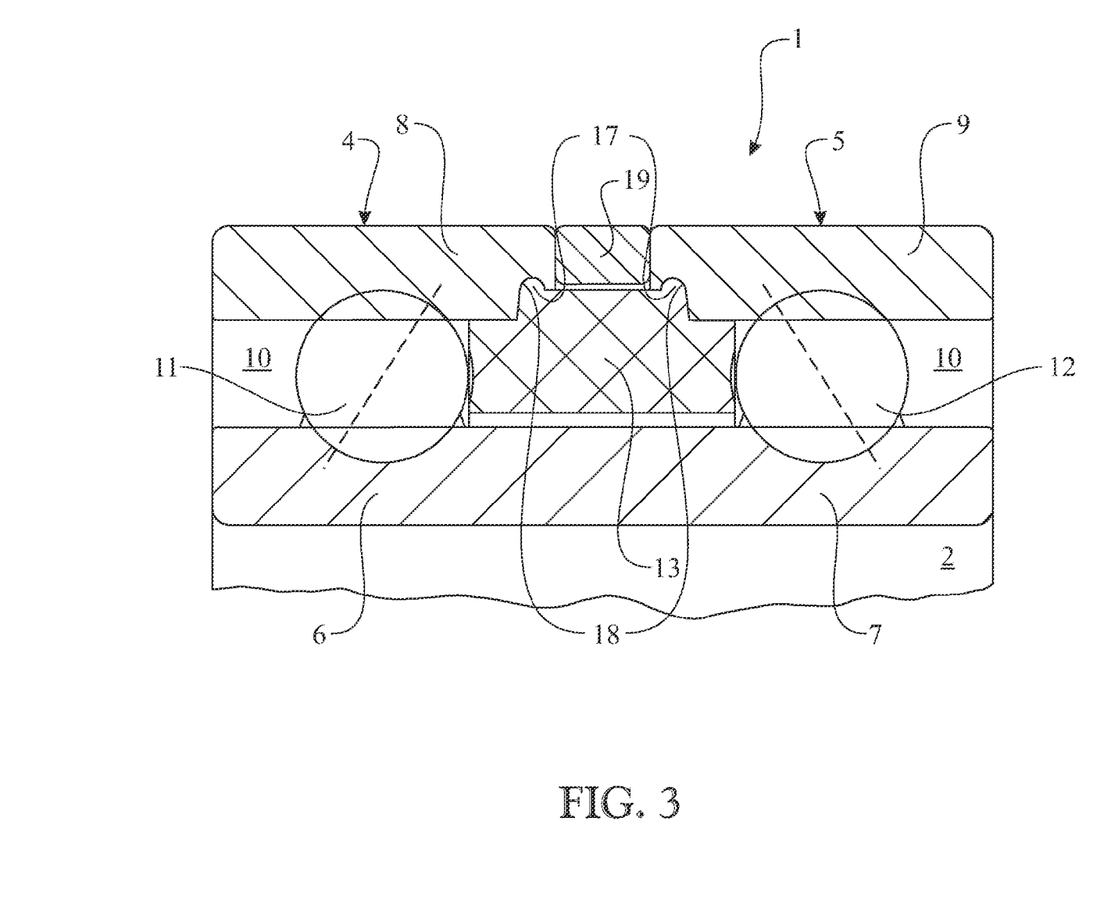
FIG. 3 shows the radial section of a bearing unit according to a third embodiment of the invention.

According to the solution of FIG. 3, a spring element 19 is disposed between the two bearing outer rings 8, 9, which spring element 19 pushes the two bearing outer rings 8, 9 away from each other and thus generates a pre-tensioning in the bearing unit 1. Here, the volume element 13 is axially fixed by two interference-fit connections 17, 18. Incidentally, due to the projections 17 in the recesses 18, a pre-tension force in the bearing unit can be generated by the volume element 13 itself.

Depending on the direction of the pre-tension force, a bearing can be implemented in an O-orientation or in an X-orientation.

Figure 4:
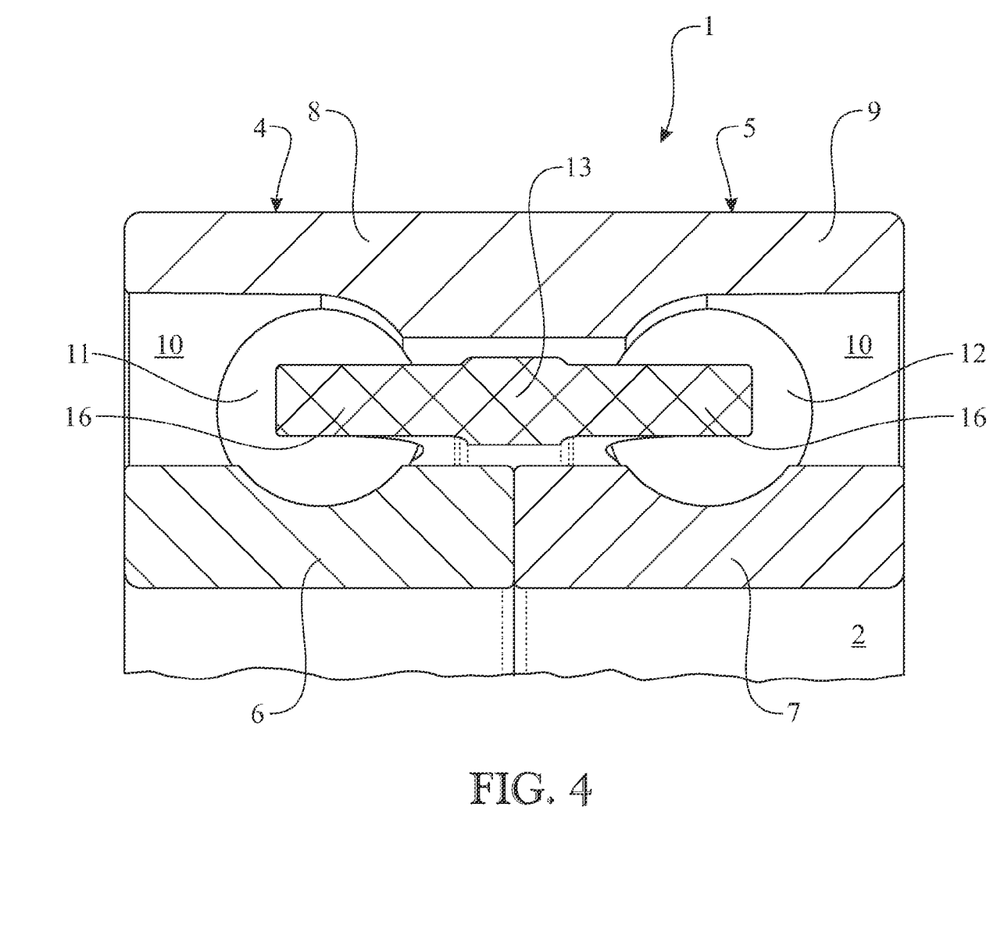
FIG. 4 shows the radial section of a bearing unit according to a fourth embodiment of the invention.

In the solution of FIG. 4, it is provided that rolling-element bearing cages 16 are used in order to guide the balls 11, 12. The volume element 13 is disposed on the cage here, i.e. it represents in effect a protrusion of the cage, which protrusion extends into the annular space between the two ball rows 11, 12 and brings about the described grease displacement. In contrast to the above-described solutions, the bearing outer ring 8, 9 of both bearings 4, 5 is formed as one piece while separate bearing inner rings 6, 7 are used.

Figure 5:
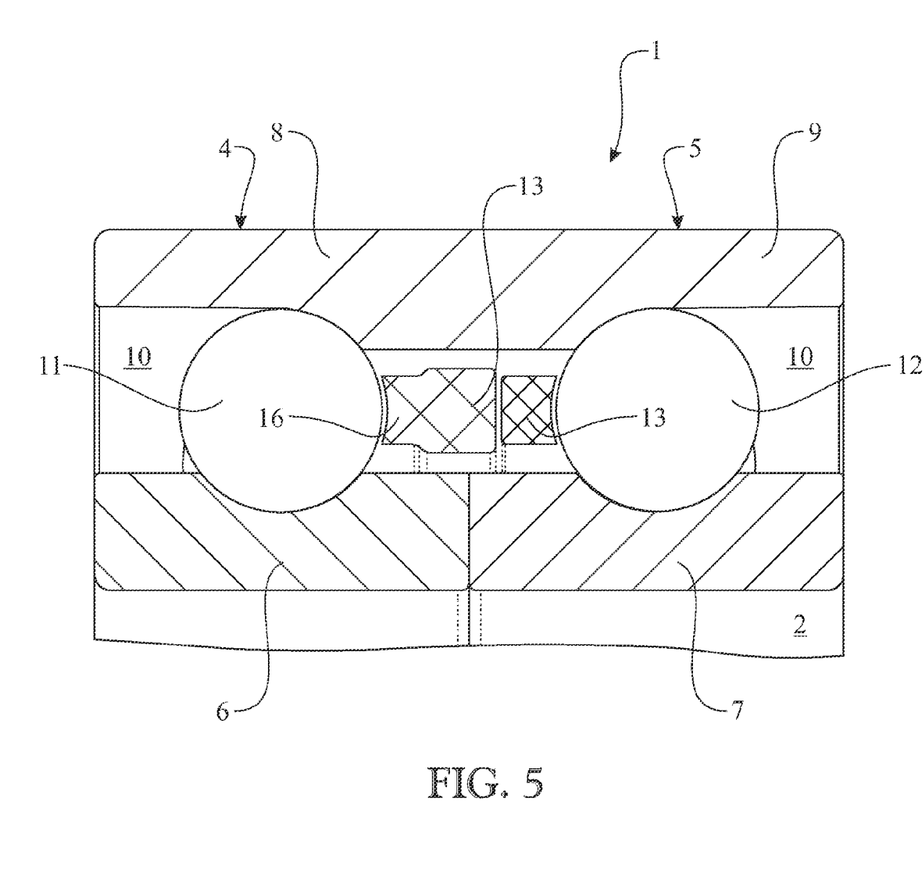
FIG. 5 shows the radial section of a bearing unit according to a fifth embodiment of the invention.

As can be seen in the solution according FIG. 5, one volume element 13 can also be disposed on the cage 16 of a bearing 4 (see left side of FIG. 5), while another separate volume element 13 is used adjacently (see right side of FIG. 5).

Figure 6:
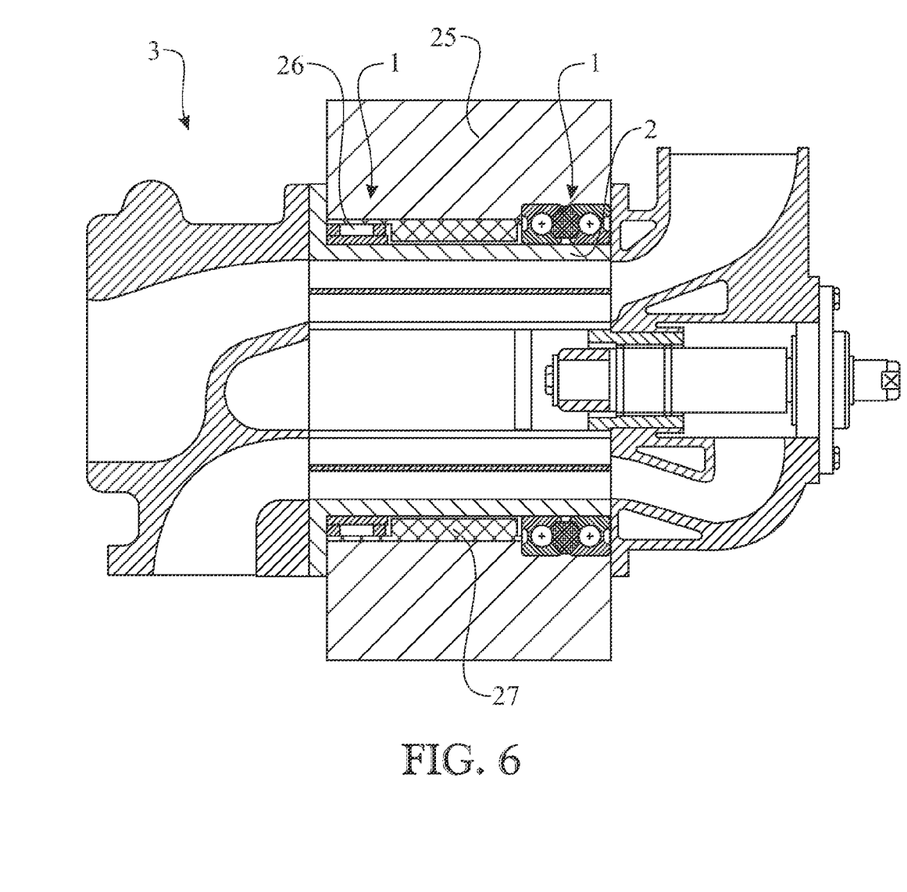
FIG. 6 shows the section of an exhaust gas turbo charger with an inventive bearing unit.

In FIG. 6, an exhaust-gas turbo charger 3 is shown, the shaft 2 of which is supported by the bearing unit 1, i.e. it is rotatably disposed in a housing 25. The bearing unit consists of a bearing in the right-hand area, which bearing is depicted in the FIGS. 1 to 5 and functions as a locating bearing. Additionally, a needle bearing 26 is used as a non-locating bearing in the left-hand area. An intermediate sleeve 27 is disposed between the two bearing systems. The intermediate sleeve also ensures that the lubricating grease remains in the area of the bearing tracks.

Figure 7:
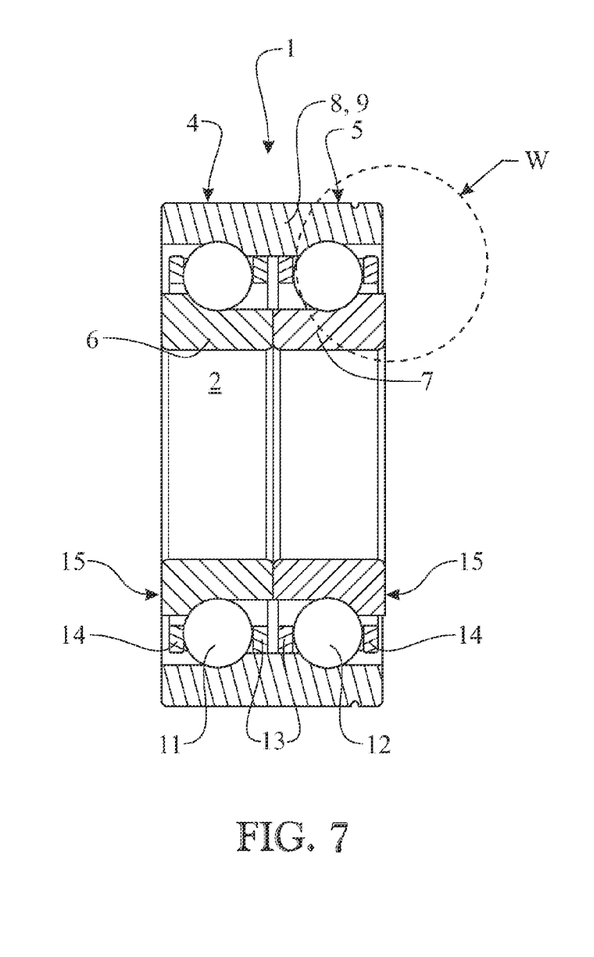
FIG. 7 shows the radial section of a bearing unit according to a sixth embodiment of the invention.
Figure 8:
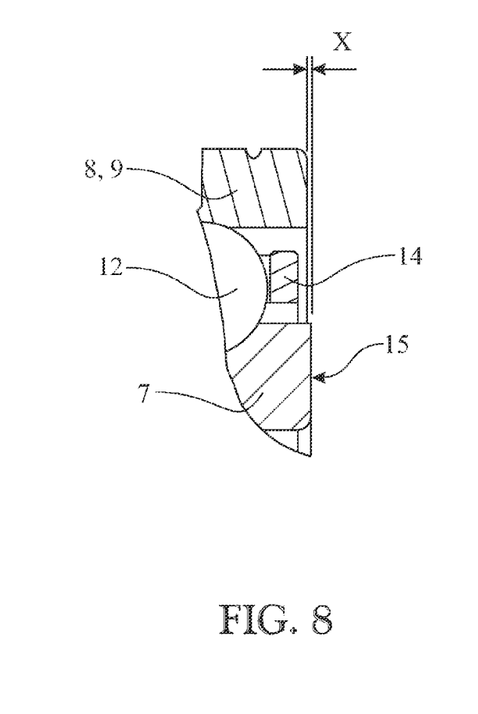
FIG. 8 shows the detail "W" according to FIG. 7.

In FIGS. 7 and 8, another variant of the inventive concept is shown. Here, it is provided that, in addition to the volume element 13, another volume element 14 is disposed in each annular space 10 between the two rolling body rows 11, 12—i.e. to be more precise: in addition to the two volume elements 13—in the area of the end sides 15 of the two bearings 4, 5. It is hereby prevented that grease laterally leaks out of the bearings 4, 5 from the area of the tracks.

Although not depicted, it is also possible that the volume element 14 is axially held in the area in the portion of the end side 15 in an analogous manner, as it is depicted in FIG. 1 or 3, i.e. by using an interference-fit connection 17, 18.

Figure 9:
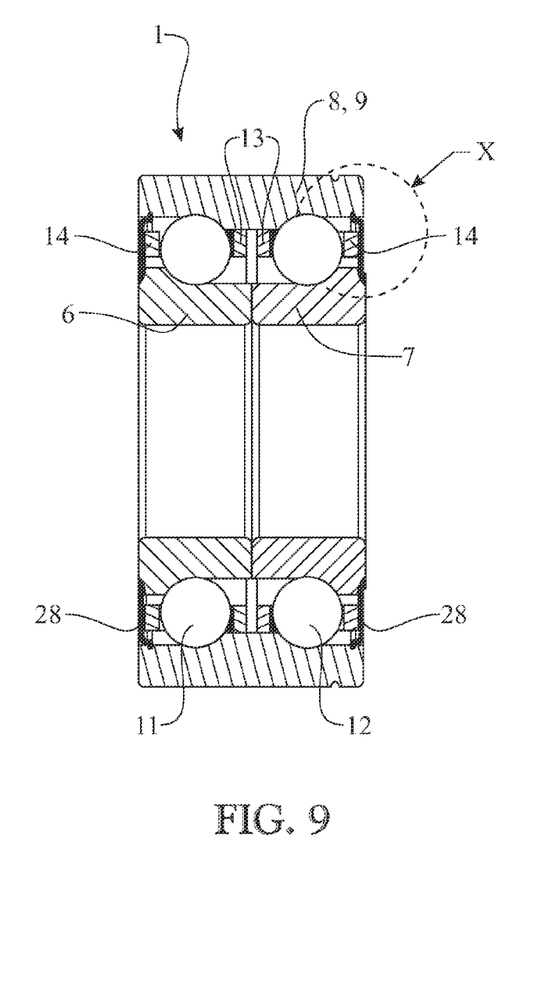
FIG. 9 shows the radial section of a bearing unit according to a seventh embodiment of the invention.
Figure 10:
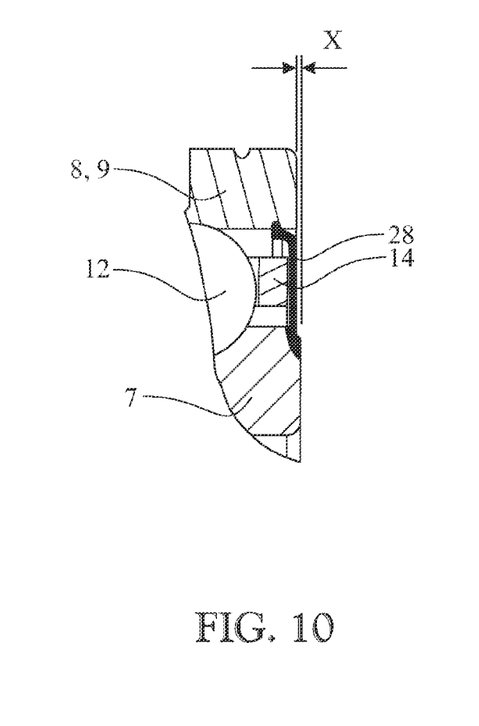
FIG. 10 shows the detail X" according to FIG. 9.
Figure 11:
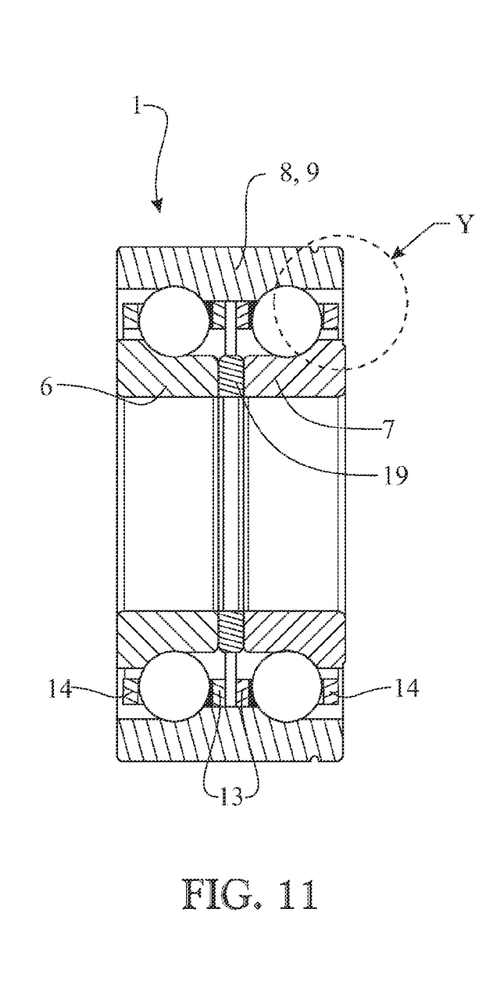
FIG. 11 shows the radial section of a bearing unit according to an eighth embodiment of the invention.
Figure 12:
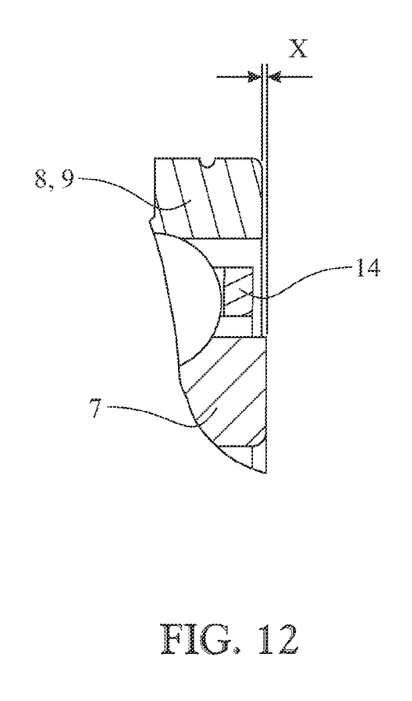
FIG. 12 shows the detail "Y" according to FIG. 11.
Figure 13:
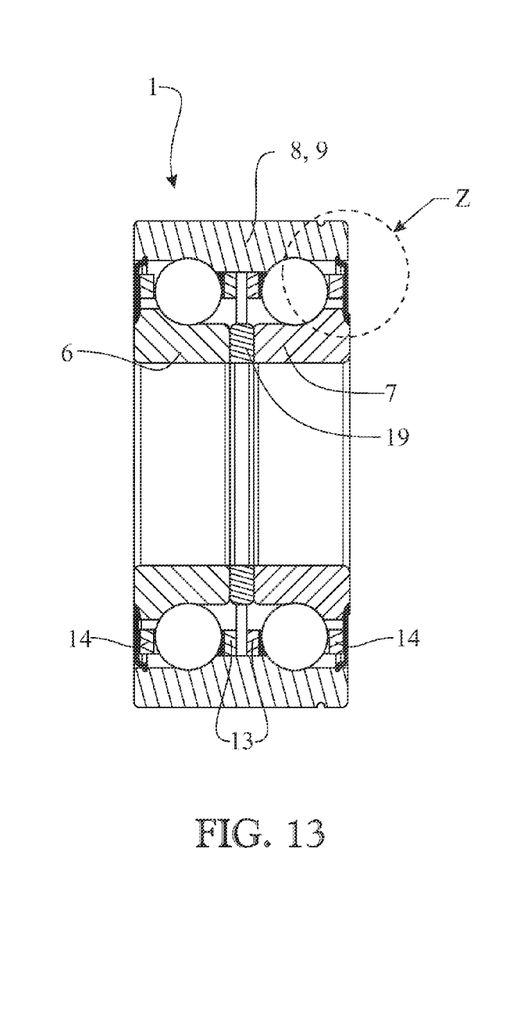
FIG. 13 shows the radial section of a bearing unit according to a ninth embodiment of the invention.
Figure 14:
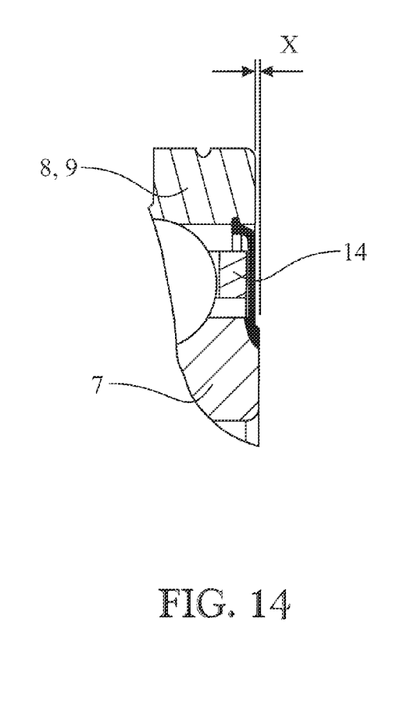
FIG. 14 shows the detail "Z" according to FIG. 13.

It can be seen in FIGS. 9 and 10 that seals 28 are disposed on the volume elements 14 or in the area of the volume elements 14, which seals 28 ensure a lateral sealing of the bearing.

In FIGS. 11 to 14, other alternative solutions are shown in which a spring element 19 provides a pre-tensioning in the bearing unit between the two bearings 4, 5 or, to be more precise, between the bearing inner rings 6, 7, respectively.

In FIGS. 8, 10, 12 and 14, it is indicated that a defined axial overhang x of the inner ring beyond the outer ring can be provided.

REFERENCE NUMBER LIST

1 Bearing unit
2 Shaft
3 Pressure generating device (boost pressure generating device)
4 First rolling-element bearing
5 Second roller-element bearing
6 Inner ring
7 Inner ring
8 Outer ring
9 Outer ring
10 Annular space
11 Rolling body (ball)
12 Rolling body (ball)
13 Volume element
14 Volume element
15 End side
16 Rolling-element bearing cage
17, 18 Interference-fit connection
17 Portion of the interference-fit connection (projection)
18 Portion of the interference-fit connection (recess)
19 Spring element
20 Track
21 Track
22 Track
23 Track
24 Connecting element
25 Housing
26 Needle bearing
27 Intermediate sleeve
28 Seal
x Axial overhang

The invention claimed is:

1. A boost pressure generating device of an internal combustion engine, comprising:
   a shaft, and
   a bearing unit rotatably supporting the shaft, the bearing unit comprising at least a first rolling-element bearing and at least a second rolling-element bearing, each rolling-element bearing including an inner ring and an outer ring, the inner ring of the first rolling-element bearing is integrally formed with the inner ring of the second rolling-element bearing without breaks therebetween, the outer ring of the first rolling-element bearing and the second rolling-element bearing being formed by separate components, wherein an annular space is defined between the respective inner and outer rings, rolling elements are disposed in the annular space,
   at least one volume element is disposed in the annular space, the volume element at least partially filling the annular space in an axial direction, and
   a connecting element attaching the outer ring of the first rolling-element bearing to the outer ring of the second rolling-element bearing, the connecting element being separate from the at least one volume element and located on a side of the outer rings opposite from the annular space, an outer surface of the connecting element being in-line with the outer surface of the outer rings of the first and second rolling-element bearings.

2. The boost pressure generating device according to claim 1, wherein: the first and second rolling-element bearings are disposed axially adjacent to each other, and the at least one volume element is disposed between the rolling elements of the first rolling-element bearing and the rolling elements of the second rolling-element bearing in the axial direction, the at least one volume element being hollow.

3. The boost pressure generating device according to claim 1, wherein the at least one volume element is disposed in an axial end portion of each rolling-element bearing adjacent to or near an axial end side of the respective rolling-element bearing.

4. The boost pressure generating device according to claim 1, wherein the volume element is an annular, solid body.

5. The boost pressure generating device according to claim 1, wherein the volume element extends over at least 50% of the annular space in a radial direction thereof.

6. The boost pressure generating device according to claim 1, wherein the connector element is configured to pretension the outer rings of the first and second rolling-element bearings.

7. The boost pressure generating device according to claim 1, wherein the outer ring of the first and second rolling-element bearings in combination with the connecting element form a recess having a rectilinear cross-section into which a portion of the volume element extends, the volume element not being secured directly to the outer ring of either one of the first and second rolling-element bearings.

8. The boost pressure generating device according to claim 1, further comprising:
 a rolling-element bearing cage disposed within the bearing unit and guiding the rolling elements, the volume element being defined as an enlarged portion of the rolling-element bearing cage.

9. The boost pressure generating device according to claim 1, wherein the volume element is axially fixed in the annular space by an interference-fit connection.

10. The boost pressure generating device according to claim 1, wherein the volume element seals the annular space relative to at least one of the inner ring(s) and the outer ring(s).

11. The boost pressure generating device according to claim 1, wherein the at least one volume element is comprised of one of metal, plastic material and ceramic material.

12. The boost pressure generating device according to claim 1, wherein the rolling-element bearings are formed as ball bearings and the rolling elements are comprised of ceramic material.

13. The boost pressure generating device according to claim 12, wherein the rolling-element bearings are formed as one of deep-groove ball bearings and angular-contact ball bearings.

14. The boost pressure generating device according to claim 13, wherein:
 the first and second rolling-element bearings are disposed axially adjacent to each other, and
 the at least one volume element is disposed between the rolling elements of the first rolling-element bearing and the rolling elements of the second rolling-element bearing in the axial direction.

15. The boost pressure generating device according to claim 14, wherein the volume element is an annular, solid body and extends over at least 50% of the annular space in a radial direction thereof.

16. The boost pressure generating device according to claim 15, wherein the at least one volume element is comprised of plastic material.

17. The boost pressure generating device according to claim 1, wherein the boost pressure generating device is an exhaust-gas turbo charger, a mechanical compressor or a gas-dynamic pressure wave supercharger.

18. A boost pressure generating device of an internal combustion engine, comprising:
 a shaft, and
 a bearing unit rotatably supporting the shaft, the bearing unit comprising at least a first rolling-element bearing and at least a second rolling-element bearing, the first and second rolling-element bearings are disposed axially adjacent to each other, each rolling-element bearing including an inner ring and an outer ring, the inner ring of the first rolling-element bearing is integrally formed with the inner ring of the second rolling-element bearing without breaks therebetween, the outer ring of the first rolling-element bearing and the second rolling-element bearing being formed by separate components, wherein an annular space is defined between the respective inner and outer rings, rolling elements are disposed in the annular space,
 at least one volume element is disposed in the annular space, the volume element at least partially filling the annular space in an axial direction,
 a spring element attaching the outer ring of the first rolling-element bearing to the outer ring of the second rolling-element bearing, the spring element being located along a side of the outer rings opposite from the annular space,
 the spring element generates an axial pre-tensioning in the rolling-element bearings, and
 the volume element forming an interference fit with the outer ring of each of the first and second rolling-element bearings to limit the spatial separation therebetween.

* * * * *